US010131966B2

United States Patent
Morisot et al.

(10) Patent No.: US 10,131,966 B2
(45) Date of Patent: Nov. 20, 2018

(54) METHOD FOR HEAT TREATMENT WITH CONTINUOUS COOLING OF A STEEL REINFORCEMENT ELEMENT FOR TIRES

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Pierre Morisot, Clermont-Ferrand (FR); Elisabeth Faucheux, Clermont-Ferrand (FR); Benoît Renaux, Clermont-Ferrand (FR); Eric Colin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 112 days.

(21) Appl. No.: 15/120,465

(22) PCT Filed: Feb. 19, 2015

(86) PCT No.: PCT/EP2015/053454
§ 371 (c)(1),
(2) Date: Aug. 19, 2016

(87) PCT Pub. No.: WO2015/124652
PCT Pub. Date: Aug. 27, 2015

(65) Prior Publication Data
US 2017/0067133 A1    Mar. 9, 2017

(30) Foreign Application Priority Data
Feb. 21, 2014   (FR) ...................... 14 51378

(51) Int. Cl.
*C21D 9/52* (2006.01)
*C21D 8/06* (2006.01)
(Continued)

(52) U.S. Cl.
CPC ............... *C21D 9/525* (2013.01); *B21C 1/02* (2013.01); *B60C 9/0007* (2013.01); *C21D 8/06* (2013.01);
(Continued)

(58) Field of Classification Search
None
See application file for complete search history.

(56) References Cited

U.S. PATENT DOCUMENTS 4,046,599 A * 9/1977 Economopoulos .... C21D 9/525
  134/14
4,767,472 A    8/1988 Vanneste
(Continued)

FOREIGN PATENT DOCUMENTS

FR    1 429 755    2/1966
FR    2 324 745    4/1977
(Continued)

OTHER PUBLICATIONS

Translation of FR 2324745 (published Apr. 15, 1977) from Espacenet.*

*Primary Examiner* — George Wyszomierski
(74) *Attorney, Agent, or Firm* — Cozen O'Connor

(57) ABSTRACT

A method for the heat treatment of a steel reinforcing element (F) for a tire, comprises a step of reducing the temperature of the reinforcing element by continuous cooling: from an initial temperature of the austenite range, to a final temperature of the ferrite-pearlite range, passing through at least one transformation range of the steel, the transformation range(s) being distinct from the bainite range. The temperature reduction step comprises a transformation (C2, C3) from the austenitic microstructure to the ferritic-pearlitic microstructure. The temperature of the rein- (Continued)

forcing element is strictly decreasing during the reduction step. The mean rate of temperature reduction during the transformation (C2, C3) of the steel microstructure is greater than or equal to 30° $C \cdot s^{-1}$ and less than or equal to 110° $C \cdot s^{-1}$.

21 Claims, 3 Drawing Sheets

(51) Int. Cl.
*C21D 9/573* (2006.01)
*B21C 1/02* (2006.01)
*B60C 9/00* (2006.01)
*C21D 9/34* (2006.01)
*C21D 1/18* (2006.01)

(52) U.S. Cl.
CPC .......... *C21D 8/065* (2013.01); *C21D 9/5732* (2013.01); *C21D 1/18* (2013.01); *C21D 9/34* (2013.01); *C21D 2211/005* (2013.01); *C21D 2211/009* (2013.01)

(56) References Cited

U.S. PATENT DOCUMENTS

| | | | | |
|---|---|---|---|---|
| 5,082,746 | A * | 1/1992 | Forward | B22D 11/00 |
| | | | | 164/459 |
| 2004/0187974 | A1* | 9/2004 | Kuppers | C21D 9/04 |
| | | | | 148/511 |
| 2005/0183808 | A1* | 8/2005 | Barguet | D02G 3/48 |
| | | | | 152/527 |
| 2008/0179377 | A1* | 7/2008 | Ozaki | B23K 9/0253 |
| | | | | 228/3.1 |
| 2014/0241829 | A1* | 8/2014 | Chiba | C22C 38/38 |
| | | | | 411/378 |

FOREIGN PATENT DOCUMENTS

| | | |
|---|---|---|
| LU | 69 039 | 2/1974 |
| WO | WO 91/00368 | 1/1991 |

\* cited by examiner

METHOD FOR HEAT TREATMENT WITH CONTINUOUS COOLING OF A STEEL REINFORCEMENT ELEMENT FOR TIRES

RELATED APPLICATIONS

This is a U.S. National Phase Application under 35 USC 371 of International Application PCT/EP2015/053454 filed on Feb. 19, 2015.

This application claims the priority of French application no. 1451378 filed Feb. 21, 2014, the entire content of which is hereby incorporated by reference.

FIELD OF THE INVENTION

The invention relates to a method for the heat treatment of a steel reinforcing element for a tire.

BACKGROUND OF THE INVENTION

A method is known from the prior art for manufacturing a steel reinforcing element for a tire, for example a steel thread.

The manufacturing method makes it possible to manufacture, from a wire, referred to as wire stock, having an initial diameter between 4.5 and 7.5 mm, a wire that can be used for the manufacture of a tire, in particular a wire that can be used for reinforcing plies of the tire, the wire having a diameter of between 0.08 mm and 0.50 mm.

Firstly, the wire stock of predominantly pearlitic microstructure is drawn, for example in a dry environment, so as to reduce its initial diameter to an intermediate diameter, for example equal to 1.3 mm. At the end of this drawing step, the steel of the wire has a microstructure comprising several mixed phases.

Next, the wire of intermediate diameter is heat treated so as to modify the microstructure of the steel. In this instance, the predominately pearlitic microstructure of the steel is regenerated.

After having coated the wire of intermediate diameter with a metal layer, the coated wire of intermediate diameter is drawn, for example in a wet environment, so as to reduce its diameter to a final diameter, for example equal to 0.20 mm.

A method for the heat treatment of the wire of intermediate diameter is known from U.S. Pat. No. 4,767,472 that comprises three steps and is carried out by means of a heat treatment facility.

The heat treatment facility comprises, in the run direction of the wire, upstream means for storing the untreated wire, for example upstream reels, a heating device, a cooling device, and downstream means for storing the treated wire, for example downstream reels.

During a first step, the temperature of the wire is increased above the austenitizing temperature of the steel in order to obtain a predominantly austenitic microstructure. For this purpose, the facility comprises a device for heating the wire comprising a gas-fired furnace.

Then, in a second step carried out downstream of the gas-fired furnace, the temperature of the wire in the austenite stability range is reduced For this purpose, the facility comprises a cooling device comprising a water bath. The bath comprises substantially pure liquid water at a temperature above 80° C. through which the wire is made to run.

In a third step, carried out downstream of the bath, the temperature of the wire is left to drop in the ambient air or else in a thermally insulated device. During this exposure to the ambient air, the predominantly austenitic microstructure is transformed to a predominately pearlitic microstructure or else the transformation, pre-initiated in the bath, is continued by passing through the pearlite transformation range.

However, the method of U.S. Pat. No. 4,767,472 requires a precise control of the cooling rates in the various ranges.

Indeed, it is necessary to very precisely control the rate of temperature reduction in the austenite range in order to return to the transformation ranges at a relatively precise predetermined temperature. By using too high a rate of reduction, there is a risk of carrying out the transformation by passing through martensite and/or bainite transformation ranges which would result in a relatively brittle wire that would therefore be unusable during a subsequent drawing step. By using too low a rate of reduction, there is a risk of obtaining too large an amount of ferrite which would result in a wire having low mechanical properties, in particular tensile strength.

Moreover, it is necessary to pass through the transformation ranges without a large change in the temperature of the wire, taking into account in particular the recalescence. Otherwise, structural heterogeneities are created that result in a loss of mechanical strength of the steel and in a poorer processability, in particular a lower work hardening capacity of the steel.

SUMMARY OF THE INVENTION

One object of the invention is to provide a more robust method that is simpler to control.

This and other objects are attained in accordance with one aspect of the invention directed to a method for the heat treatment of a steel reinforcing element for a tire, the method comprising a step of reducing the temperature of the reinforcing element by continuous cooling:

from an initial temperature of the initial austenite stability range of the steel, to a final temperature of the final ferrite-pearlite stability range of the steel, passing through at least one transformation range of the steel, the transformation range(s) being distinct from the bainite range, the temperature reduction step comprising a transformation of the steel microstructure from the austenitic microstructure to the ferritic-pearlitic microstructure, the temperature of the reinforcing element being strictly decreasing during the reduction step, the mean rate of temperature reduction during the transformation of the steel microstructure being greater than or equal to 30° $C.\cdot s^{-1}$ and less than or equal to 110° $C.\cdot s^{-1}$.

The method according to the invention is relatively robust and simple to control.

Indeed, unlike the method described in U.S. Pat. No. 4,767,472 and certain heat treatment methods from the prior art, referred to as isothermal transformation methods (abbreviated to "IHT" for isothermal heat treatment), in which the transformation of the steel takes place at substantially constant temperature, the method according to an embodiment of the invention involves continuous cooling (abbreviated to "CCHT" for continuous cooling heat treatment). The two types of methods are easily distinguished, in particular by means of the time-temperature diagrams used to represent them. An IHT-type method uses a TTT (time-temperature-transformation) diagram and comprises one or more changes of rate during the temperature reduction step. A CCHT-type method uses a CCT (continuous cooling transformation) diagram and has a continuous rate during the temperature reduction step. Thus, among other features of a CCHT-type method, the temperature of the reinforcing element is reduced during the transformation of the steel microstructure.

In the method according to the invention, once the rate of temperature reduction is defined, it is then relatively easy to control it considering its continuity during the temperature reduction step.

In addition, unlike the IHT-type methods in which a very large amount of heat is supplied to the reinforcing element in order to keep it at substantially constant temperature during the transformation, the method according to an embodiment of the invention, being of CCHT type, makes it possible to reduce the energy consumption of the method.

In the present description, any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

In one embodiment, the mean rate of temperature reduction during the transformation of the steel microstructure is greater than or equal to $40°$ C.·s$^{-1}$, preferably greater than or equal to $50°$ C.·s$^{-1}$, more preferentially greater than or equal to $60°$ C.·s$^{-1}$ and more preferentially still greater than or equal to $70°$ C.·s$^{-1}$.

The use of too low a mean rate of reduction does not make it possible to rapidly carry out the transformation of the steel microstructure. Thus, the risk of obtaining a steel having undesired mechanical properties is minimized.

In one embodiment, the mean rate of temperature reduction during the transformation of the steel microstructure is less than or equal to $100°$ C.·s$^{-1}$ and more preferentially less than or equal to $90°$ C.·s$^{-1}$.

The use of too high a rate of reduction has the risk of resulting in a quenching of the steel which, according to the desired properties of the steel, is not desirable.

The mean rate of reduction is understood to mean the ratio of the difference in degrees Celsius between the temperature before transformation and after transformation to the time taken to carry out the transformation.

Thus, several embodiments could be envisaged in which the mean rate of reduction is within ranges extending from $30°$ C.·s$^{-1}$ to $90°$ C.·s$^{-1}$, from $30°$ C.·s$^{-1}$ to $100°$ C.·s$^{-1}$, from $30°$ C.·s$^{-1}$ to $110°$ C.·s$^{-1}$, from $40°$ C.·s$^{-1}$ to $90°$ C.·s$^{-1}$, from $40°$ C.·s$^{-1}$ to $100°$ C.·s$^{-1}$, from $40°$ C.·s$^{-1}$ to $110°$ C.·s$^{-1}$, from $50°$ C.·s$^{-1}$ to $90°$ C.·s$^{-1}$, from $50°$ C.·s$^{-1}$ to $100°$ C.·s$^{-1}$, from $50°$ C.·s$^{-1}$ to $110°$ C.·s$^{-1}$, from $60°$ C.·s$^{-1}$ to $90°$ C.·s$^{-1}$, from $60°$ C.·s$^{-1}$ to $100°$ C.·s$^{-1}$, from $60°$ C.·s$^{-1}$ to $110°$ C.·s$^{-1}$, from $70°$ C.·s$^{-1}$ to $90°$ C.·s$^{-1}$, from $70°$ C.·s$^{-1}$ to $100°$ C.·s$^{-1}$ and from $70°$ C.·s$^{-1}$ to $110°$ C.·s$^{-1}$.

In one embodiment, the initial temperature is greater than or equal to $750°$ C., preferably greater than or equal to $800°$ C. and more preferentially greater than or equal to $850°$ C.

In one embodiment, the final temperature is less than or equal to $650°$ C., preferably less than or equal to $550°$ C. and more preferentially less than or equal to $450°$ C.

Thus, several embodiments could be envisaged in which the initial temperature/final temperature pairs are $750°$ C./$450°$ C., $750°$ C./$550°$ C., $750°$ C./$650°$ C., $800°$ C./$450°$ C., $800°$ C./$550°$ C., $800°$ C./$650°$ C., $850°$ C./$450°$ C., $850°$ C./$550°$ C., $850°$ C./$650°$ C.

In one embodiment, the transformation of the steel microstructure takes place in a temperature range extending from $800°$ C. to $400°$ C., preferably from $750°$ C. to $500°$ C. and more preferentially from $650°$ C. to $550°$ C.

Advantageously, the temperature is reduced by more than $30°$ C., preferably by more than $50°$ C., more preferentially by more than $75°$ C. and more preferentially still by more than $100°$ C. during the transformation of the steel microstructure.

The expression "by more than X° C." means that the temperature is reduced by a temperature range strictly greater than X° C., the value of X° C. therefore being excluded.

The microstructure of the steel is completely ferritic, pearlitic or a mixture of these microstructures.

Thus, the microstructure of the steel is free of martensite and/or bainite. A ferritic-martensitic microstructure leads to cleavage between the ferritic and martensitic phases which is undesirable. A martensitic microstructure is not ductile enough to allow drawing of the wire, which would break too frequently. Thus, preferably, the transformation range(s) are distinct from the martensitic range.

A bainitic microstructure would result in a relatively brittle wire that would therefore be unusable during a subsequent drawing step.

A ferritic, pearlitic or ferritic-pearlitic microstructure is distinguished from another microstructure, in particular martensitic or bainitic microstructure, by metallographic observation. The ferritic-pearlitic microstructure has ferrite grains and also lamellar pearlitic zones. On the contrary, the martensitic microstructure comprises laths and/or needles that those skilled in the art will know how to distinguish from the grains and lamellae of the ferritic-pearlitic and pearlitic microstructures.

More preferably, the microstructure of the steel is completely ferritic-pearlitic.

A completely ferritic, pearlitic or ferritic-pearlitic microstructure is understood, in a manner known by those skilled in the art, to mean that the steel comprises a ferritic, pearlitic or ferritic-pearlitic phase in a weight proportion of greater than or equal to 98% of this phase relative to the sum of the percentages of the other phases.

Advantageously, the temperature reduction step comprises a reduction in the temperature of the reinforcing element in the initial stability range of the steel.

Advantageously, the temperature reduction step comprises a reduction in the temperature of the reinforcing element in the final stability range of the steel.

In one embodiment, the steel microstructure is transformed by passing through at least one transformation range.

Advantageously, the temperature for entering the transformation range, i.e. the temperature delimiting the passage between the initial stability range and the transformation range, is greater than or equal to $550°$ C., preferably greater than or equal to $600°$ C., more preferentially greater than or equal to $650°$ C. and more preferentially still greater than or equal to $700°$ C.

Advantageously, the temperature for leaving the transformation range, i.e. the temperature delimiting the passage between the transformation range and the final stability range, is greater than or equal to $400°$ C., preferably greater than or equal to $500°$ C., more preferentially greater than or equal to $600°$ C. and more preferentially still greater than or equal to $650°$ C.

In one preferred embodiment, the transformation range comprises the ferrite transformation range.

In one preferred embodiment, the transformation range comprises the pearlite transformation range.

In one embodiment, prior to the step of reducing the temperature of the reinforcing element, the method comprises a step of increasing the temperature of the reinforcing element to a temperature greater than or equal to the austenitizing temperature of the steel.

By heating the steel above the austenitizing temperature of the steel, a predominantly austenitic, or even completely austenitic microstructure is obtained.

Advantageously, the mean run speed of the reinforcing element is strictly greater than 40 m·min$^{-1}$, preferably strictly greater than 90 m·min$^{-1}$, more preferentially greater than or equal to 200 m·min$^{-1}$ and more preferentially still greater than or equal to 300 m·min$^{-1}$.

The mean speed should be understood to mean the ratio of the distance traveled by one point of the reinforcing element to the time taken by this point to travel this distance.

Unlike the method described in U.S. Pat. No. 4,767,472 and the IHT methods that inevitably require a relatively long transformation time, for example of the order of several tens of seconds, the transformation in a CCHT-type method may be relatively short, for example of the order of several seconds, which makes it possible to use high run speeds in a facility having a reduced size.

Optionally, heat is supplied to the reinforcing element during at least one portion of the step of reducing the temperature of the reinforcing element.

The supply of heat to the reinforcing element makes it possible to control the reduction in temperature of the reinforcing element and therefore to obtain the desired microstructure of the steel. In particular, the supply of heat makes it possible not to reduce the temperature too rapidly which would result in the creation of undesired phases in the microstructure of the steel.

Unlike the supply of heat of an IHT-type method, the supply of heat of the method is relatively small since it does not have the objective of keeping the temperature of the reinforcing element constant.

According to other optional features of the method:
The steel reinforcing element is a steel wire.
The steel wire has a diameter ranging from 0.5 to 5.5 mm, preferably from 0.5 to 3 mm and more preferentially from 1 to 2.5 mm.
The steel comprises from 0.4% to 1.2%, preferably from 0.4% to 1% and more preferentially from 0.4% to 0.8% of carbon by weight.

Another subject of the invention is a steel reinforcing element capable of being obtained by a method as described above.

BRIEF DESCRIPTION OF THE DRAWINGS

The invention will be better understood from reading the following description, given solely by way of non-limiting example and with reference to the drawings in which.

DETAILED DESCRIPTION OF THE DRAWINGS

Figure 1:
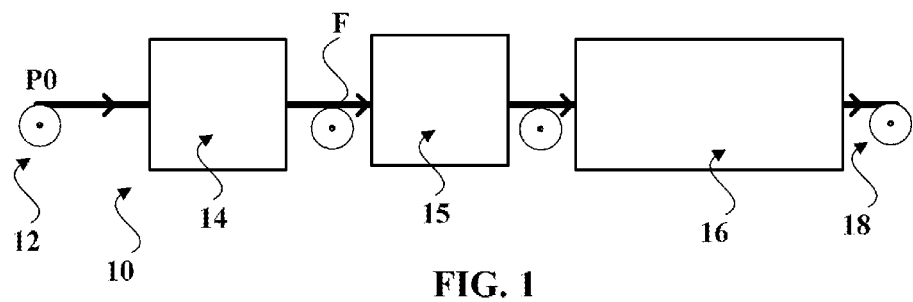
FIG. 1 is a diagram of a heat treatment facility according to a first embodiment for the implementation of the method according to the invention.

Example of a Heat Treatment Facility for the Implementation of the Method According to the Invention Represented in FIG. 1 is a first embodiment of a facility for the heat treatment of a reinforcing element for a tire, denoted by the general reference 10.

The treatment facility 10 is capable of treating steel reinforcing elements F, here steel wires. The steel wires F have a diameter ranging from 0.5 to 5.5 mm, preferably from 0.7 to 3 mm and more preferentially from 1 to 2.5 mm.

The facility 10 comprises, in the run direction of the element F in the facility 10, from upstream to downstream, upstream means 12 for storing the element F, a device 14 for heating the element F, a device 15 for maintaining the element F at temperature, a device 16 for cooling the element F and downstream means 18 for storing the heat-treated element F.

The upstream 12 and downstream 18 storage means each comprise a reel for storing the element F respectively making it possible to unwind and wind up the element F. In the upstream storage means 12, the element F is then connected to the potential P0.

Figure 2:
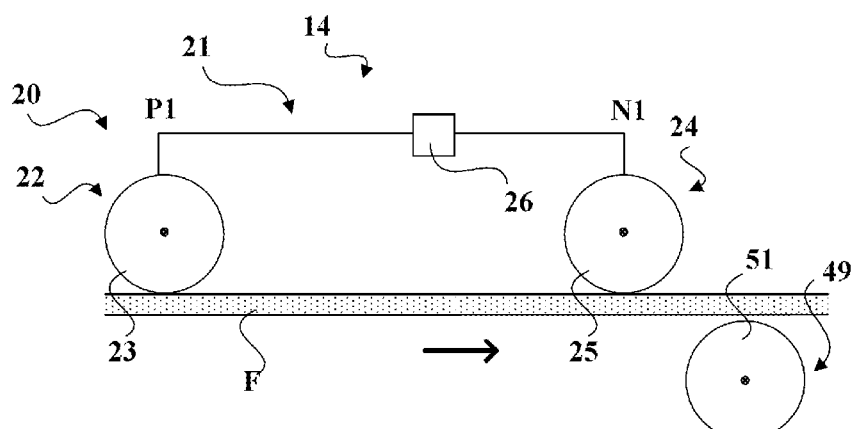
FIG. 2 is a diagram of a device for heating the facility in FIG. 1.

The heating device 14 is represented in FIG. 2. The device 14 makes it possible to heat the element F at a temperature greater than or equal to the austenitizing temperature of the steel.

The heating device 14 comprises means 20 for supplying heat to the element F. The heat supply means 20 comprise means 21 for supplying heat by the Joule effect through the element F. These heat supply means 21 comprise two electrically conductive terminals 22, 24 powered by a current source, here a transformer 26. Each terminal 22, 24 is respectively connected to the phase conductor P1 and the neutral conductor N1. In this instance, each terminal 22, 24 respectively comprises an electrically conductive rotatable pulley 23, 25. Each terminal 22, 24 is arranged so that each pulley 23, 25 is in contact with the element F during the operation of the facility 10.

Figure 3:
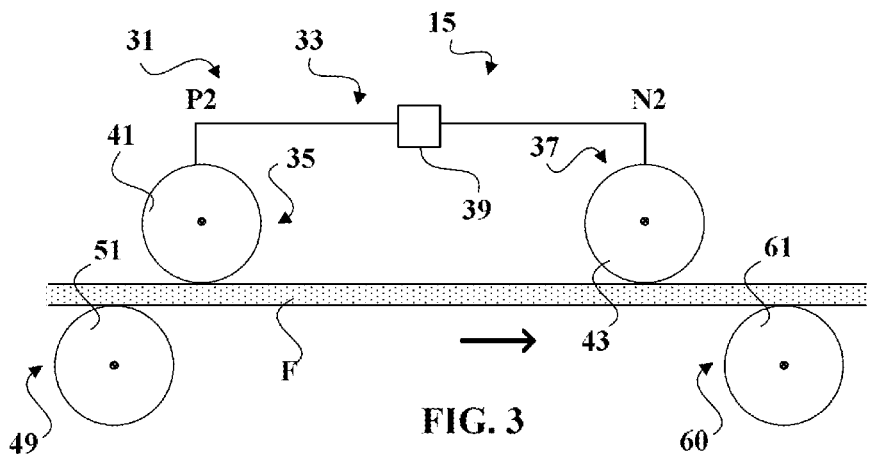
FIG. 3 is a diagram of a temperature-maintaining device of the facility in FIG. 1.

The temperature-maintaining device 15 is represented in FIG. 3. The device 15 is arranged between the heating device 14 and the cooling device 16 and makes it possible to maintain the temperature of the element F at a temperature greater than or equal to the austenitizing temperature of the steel.

The maintaining device 15 comprises means 31 for supplying heat to the element F. The heat supply means 31 comprise means 33 for supplying heat by the Joule effect through the element F. These heat supply means 31 comprise two electrically conductive terminals 35, 37 powered by a current source, here a transformer 39. Each terminal 35, 37 is respectively connected to the phase conductor P2 and the neutral conductor N2. In this instance, each terminal 35, 37 respectively comprises an electrically conductive rotatable pulley 41, 43. Each terminal 35, 37 is arranged so that each pulley 41, 43 is in contact with the element F during the operation of the facility 10.

The facility 10 also comprises means 49 for applying the element F against the terminals 24, 35 and more specifically in contact with the pulleys 25, 41. The application means 49 here comprise a rotatable pulley 51.

Figure 4:
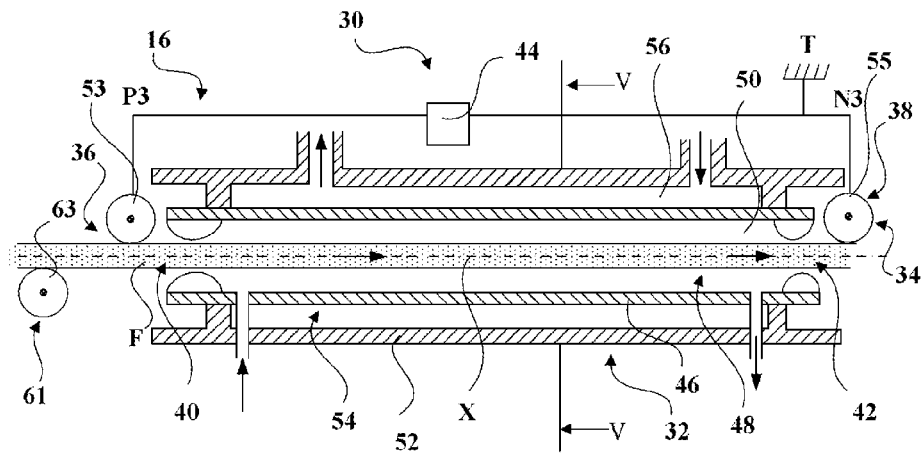
FIG. 4 is a diagram of a device for cooling the facility in FIG. 1.
Figure 5:
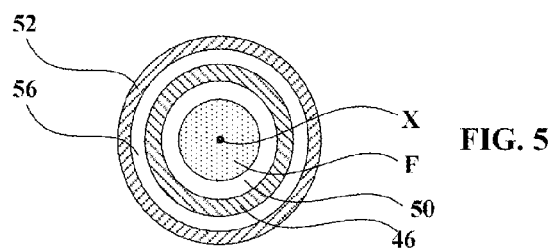
FIG. 5 is a cross-sectional view along V-V of the cooling device in FIG. 4.

The cooling device 16 is represented in FIGS. 4 and 5.

The cooling device 16 comprises means 30 for supplying heat to the element F and means 32 for extracting heat from the element F to at least one cold source, here two cold sources. The cold source(s) are different from ambient air.

The heat supply means 30 comprise means 34 for supplying heat by the Joule effect through the element F. The heat supply means 34 comprise two electrically conductive terminals 36, 38 respectively positioned upstream and downstream of an inlet 40 and an outlet 42 of the element F into/from the cooling device 16. Each terminal 36, 38 is respectively connected to the phase conductor P3 and the neutral conductor N3, the neutral conductor N3 being at the same potential as the earth T. Each terminal 36, 38 respectively comprises an electrically conductive rotatable pulley 53, 55. The heat supply means 34 also comprise a current source, here a transformer 44, powering the two terminals 36, 38. Each terminal 36, 38 is arranged so that each pulley 53, 55 is in contact with the element F by means respectively of the pulleys 53, 55 during the operation of the facility 10.

The facility 10 also comprises means 61 for applying the element F against the terminals 37, 36 and more specifically in contact with the pulleys 53, 55. The application means 61 here comprise a rotatable pulley 63.

The heat extraction means 32 are of the type having convective exchange between the element F and the cold source(s).

The heat extraction means 32 comprise a run chamber 46 of the element F. The run chamber 46 forms a jacket and has a general shape with axial symmetry with respect to the run axis X of the element F, in this instance having a circular general cross section. The run chamber 46 contains an intermediate cold source 48. The heat exchange between the element F and the intermediate cold source 48 occurs by convection, here by forced convection due to the circulation of the intermediate cold source 48 in the run chamber 46 from upstream to downstream in the run direction of the element F. As a variant, the cold source is devoid of forced convection. For example, the intermediate cold source 48 comprises a heat exchange gas 50. Preferably, the gas 50 is selected from reducing gases, inert gases and mixtures of these gases. More preferentially, the gas 50 is a reducing gas, here dihydrogen $H_2$. As a variant, the gas 50 comprises several gaseous constituents, for example an $H_2+N_2$ mixture. In another variant, the gas 50 is nitrogen $N_2$.

The heat extraction means 32 also comprise a chamber 52 for circulation of an external cold source 54. The circulation chamber 52 forms a jacket and has a general shape with axial symmetry with respect to the run axis X of the element F, in this instance having a circular general cross section. The circulation chamber 52 is radially external with respect to the run chamber 46 and arranged around the latter. The intermediate cold source 48 is arranged between the element F and the external cold source 54. The heat exchange between the intermediate cold source 48 and the external cold source 54 occurs by convection, here by forced convection due to the circulation of the external cold source 54 in the circulation chamber 52, from downstream to upstream in the run direction of the element F.

For example, the external cold source 54 comprises a heat exchange liquid 56, here water.

The heat supply means 30 and heat extraction means 32 are arranged so that the temperature of the element F at the outlet 42 is strictly less than the temperature of the element F at the inlet 40.

Example of a Heat Treatment Method According to the Invention

Figure 6:
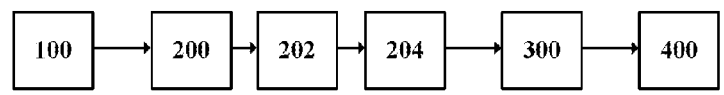
FIG. 6 is a diagram illustrating various steps of a method for manufacturing a reinforcing element comprising steps of a heat treatment method according to the invention.

An example of a method for the heat treatment of the steel reinforcing element F for a tire will now be described with reference to FIGS. 6 and 7 within the context of a method for manufacturing the element F.

The steel comprises for example from 0.4% to 1.2%, preferably from 0.4% to 1% and more preferentially from 0.4% to 0.8% of carbon by weight. The steel may also comprise specific alloying elements such as Cr, Ni, Co, V, or various other known elements (see, for example, *Research Disclosure* 34984—"*Micro-alloyed steel cord constructions for tires*"—May 1993; *Research Disclosure* 34054—"*High tensile strength steel cord constructions for tires*"—August 1992). In this instance, a conventional steel containing 0.7% of carbon is used.

Prior to the heat treatment method, the element F is drawn, for example in a dry environment, so as to reduce its initial diameter, equal to 5.5 mm, to an intermediate diameter, here equal to 1.3 mm, in a step 100. At the end of this drawing step 100, the steel of the element F has a microstructure comprising several mixed phases.

The heat treatment method according to the invention is then carried out in which the element F of intermediate diameter is heat treated so as to modify the microstructure of the steel. In this instance, the predominately pearlitic microstructure is regenerated.

The heat treatment method comprises a step 200 of increasing the temperature of the element F from a temperature T0 to a temperature T1 greater than or equal to the austenitizing temperature of the steel. As illustrated in FIG. 7, this step lasts from t0 to t1 and is carried out by means of the heating device 14.

During at least one part of this step 200, heat is supplied to the element F by the Joule effect through the element F. Each terminal 22, 24 is in contact with the element F during this step 200.

The temperature of the element F is increased from T0 to T1 at a mean rate of increase ranging from 100 to 1000° $C.\cdot s^{-1}$, preferably 500 to 950° $C.\cdot s^{-1}$ and more preferentially from 700 to 900° $C.\cdot s^{-1}$. Here, the rate of increase is equal to 836° $C.\cdot s^{-1}$.

Preferably, T0 is less than or equal to 100° C. and more preferentially less than or equal to 50'C. Here, T0=20° C. Preferably, T1 is greater than or equal to 850° C. and more preferentially greater than or equal to 900° C. Here, T1=975° C.

The method comprises a step 202 of maintaining the temperature of the element F at a temperature greater than or equal to the temperature T1. As illustrated in FIG. 7, this step 202 lasts from t1 to t2 and is carried out by means of the temperature-maintaining device 15.

As a variant, the method may not comprise a step 202 of maintaining the temperature of the steel at the austenitizing temperature of the steel. Thus, a method could be envisaged without a temperature-maintaining step, that is to say in which the step of increasing the temperature of the element F from a temperature T0 to a temperature T1 greater than or equal to the austenitizing temperature of the steel and the step of reducing the temperature described below are carried out consecutively. In this variant, the facility 10 does not comprise a device 15 arranged between the heating device 14 and the cooling device 16.

Then, the element F arrives at the inlet 40 of the heat extraction means 32 of the device 16 at the time t2. The method then comprises a step 204 of reducing the temperature of the element F by continuous cooling from an initial temperature T2 to a final temperature T3. As illustrated in FIG. 7, this step 204 lasts from t2 to t3 and is carried out by means of the cooling device 16.

In order to reduce the temperature from T2 to T3, heat is extracted from the element F by thermal convection in contact with the intermediate cold source 48, in the example by virtue of the heat extraction means 32.

The temperature is reduced from T2 to T3 at a mean rate of reduction greater than or equal to 30° C.·s$^{-1}$. Advantageously, the temperature is reduced from T2 to T3 at a mean rate of reduction greater than or equal to 40° C.·s$^{-1}$, preferably greater than or equal to 50° C.·s$^{-1}$, more preferentially greater than or equal to 60° C.·s$^{-1}$ and more preferentially still greater than or equal to 70° C.·s$^{-1}$. In this preferred embodiment, the rate of reduction is less than or equal to 110° C.·s$^{-1}$, preferably less than or equal to 100° C.·s$^{-1}$ and more preferentially less than or equal to 90° C.·s$^{-1}$.

In the example described, T2 is greater than or equal to 750° C., preferably greater than or equal to 800° C. and more preferentially greater than or equal to 850° C. Here, T2=T1=975° C.

In the example described, T3 is less than or equal to 650° C., preferably less than or equal to 550° C. and more preferentially less than or equal to 450° C. Here, T3=400° C.

Preferably, heat is supplied to the element F during at least one part of the reduction step 204, in the example by virtue of the means 34 for supplying heat by the Joule effect through the element F which is then in contact with the terminals 36, 38.

The temperature of the reinforcing element F is strictly decreasing during the reduction step 204.

The temperature reduction step 204 is after the temperature-maintaining step 202 which is itself after the temperature increase step 200.

The element F is made to run at a mean run speed preferably strictly greater than 40 m·min$^{-1}$, preferably strictly greater than 90 m·min$^{-1}$, more preferentially greater than or equal to 200 m·min$^{-1}$ and more preferentially still greater than or equal to 300 m·min$^{-1}$. Here, the run speed is equal to 315 m·min$^{-1}$ The inlet temperature of the water is between 20° C. and 40° C., and here substantially equal to 15° C. The inlet temperature of the gas is substantially equal to 20° C.

The element F then arrives at the outlet 42 of the heat extraction means 32 of the device 16 at the time t3. The element F obtained by the method has, in this example, a tensile strength Rm equal to 1150 MPa.

After the heat treatment method, in a step 300, the heat-treated element F of intermediate diameter is coated with a metal layer, for example a layer of brass.

Then, in a step 400, the coated, heat-treated element F of intermediate diameter is drawn, for example, in a wet environment so as to reduce its diameter to a final diameter, for example equal to 0.23 mm.

The element F thus obtained could be used as an individual wire for reinforcing tire plies or else for the manufacture of a layered cord or else a stranded cord for reinforcing tire plies.

Figure 7:
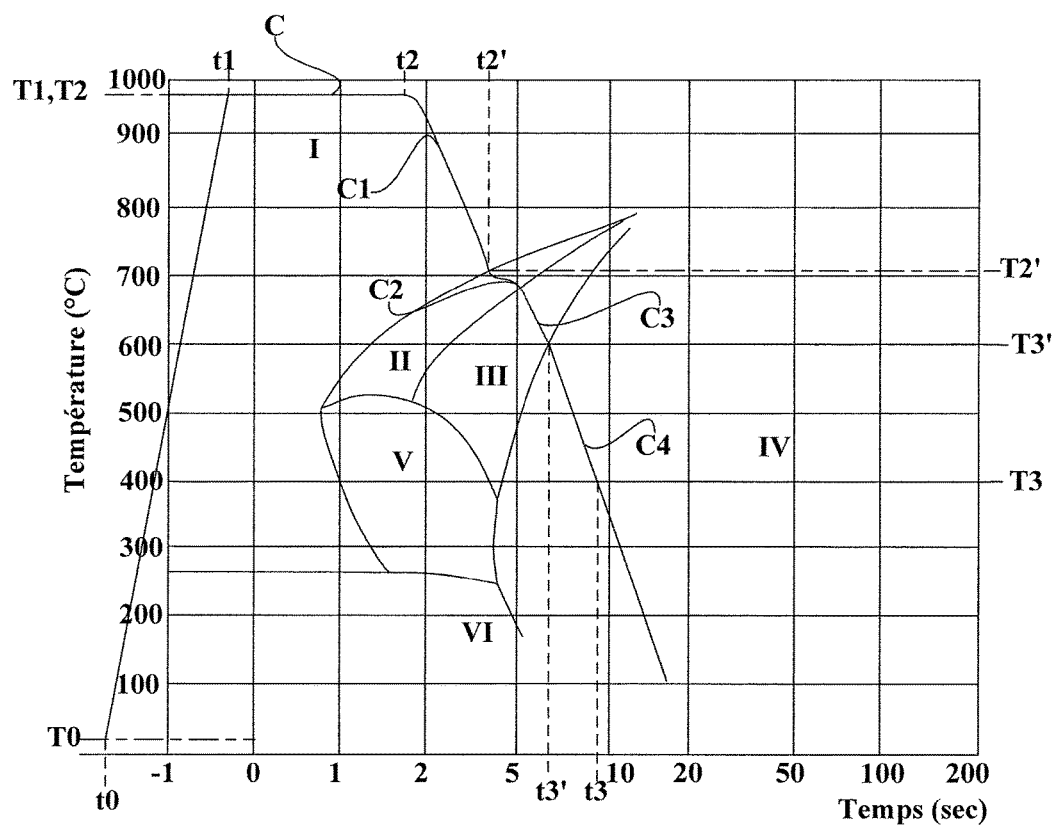
FIG. 7 is a CCT time-temperature diagram illustrating the heat treatment method of FIG. 6.

The heat treatment method has been illustrated in FIG. 7 by a curve C representing the change in the temperature of the element F as a function of the time. The reduction step 204 will be described with reference to FIG. 7.

The initial temperature T2 belongs to an initial stability range of the steel, here the austenite stability range I in which the steel has a predominantly austenitic microstructure.

The final temperature T3 belongs to a final stability range of the steel, here the pearlite stability range IV in which the steel has a predominantly pearlitic microstructure.

The reduction step 204 comprises a reduction of the temperature of the element F in the initial stability range, here in the austenite stability range. This reduction is illustrated by the portion C1 of the curve C between the points (t2, T2) and (t2', T2').

Next, the reduction step 204 comprises a transformation of the steel microstructure from the microstructure of the initial range, here austenitic, to a microstructure of the final range, here ferritic-pearlitic. The steel microstructure is transformed by passing through at least one transformation range. In this instance, the ferrite transformation range II (portion C2 of the curve C) and pearlite transformation range III (portion C3 of the curve C) are passed through successively between the points (t2', T2') and (t3', T3'). The transformation ranges of the steel are distinct from the bainite range and preferably from the martensite range.

This transformation of the steel microstructure takes place in a temperature range [T2', T3'] extending from 800° C. to 400° C., preferably from 750° C. to 500° C. and more preferentially from 650° C. to 550° C. The temperature T2' for entering the ferrite transformation range II, i.e. the temperature delimiting the passage between the initial stability range I and ferrite transformation range II, is greater than or equal to 550° C., preferably greater than or equal to 600° C., more preferentially greater than or equal to 650° C. and more preferentially still greater than or equal to 700° C. The temperature T3' leaving the pearlite transformation range III, i.e. the temperature delimiting the passage between the pearlite transformation range III and the final stability range IV, is greater than or equal to 400° C., preferably greater than or equal to 500° C., more preferentially greater than or equal to 600° C. and more preferentially still greater than or equal to 650° C. In this instance, T2'=710° C. and T3'=600° C.

During this transformation of the steel microstructure, the temperature of the element F is reduced, by simultaneously extracting heat from the element F by thermal convection in contact with the intermediate cold source 48 and supplying heat to the element F by the Joule effect through the element F. In order to reduce the temperature of the element F, more heat is extracted than is supplied thereto.

During this transformation of the steel microstructure, the temperature of the element F is reduced for example by more than 30° C., preferably by more than 50° C., more preferentially by more than 75° C. and more preferentially still by more than 100° C. In this instance, the temperature is reduced by 123° C.

During this transformation, the mean rate of temperature reduction is greater than or equal to 30° C.·s$^{-1}$. Advantageously, the mean rate of temperature reduction is greater than or equal to 40° C.·s$^{-1}$, preferably greater than or equal to 50° C.·s$^{-1}$, more preferentially greater than or equal to 60° C.·s$^{-1}$ and more preferentially still greater than or equal to 70° C.·s$^{-1}$.

During this transformation, the mean rate of temperature reduction is less than or equal to 110° C.·s$^{-1}$, preferably less than or equal to 100° C.·s$^{-1}$ and more preferentially less than or equal to 90° C.·s$^{-1}$.

In this instance, the mean rate of temperature reduction is equal to 86° C.·s$^{-1}$.

Next, the reduction step 204 comprises a reduction of the temperature of the element F in the final stability range, here in the pearlite stability range. This reduction is illustrated by the portion C4 of the curve C between the points (t3', T3') and (t3, T3).

It will be noted that the method according to the invention is a continuous cooling method. Thus, as illustrated in the CCT diagram of FIG. 7, there is no sudden change in the rate of cooling of the element F between the temperatures T2 and T3. In addition, the transformation takes place completely between the inlet 40 and the outlet 42 of the cooling device 16. In other words, the element F leaves the initial stability range downstream of the inlet 40 and upstream of the outlet 42 and reaches the final stability range downstream of the inlet 40 and upstream of the outlet 42.

By transforming the steel microstructure between the inlet 40 and the outlet 42 of the cooling device 16, the formation of oxides at the surface of the steel is limited, or even avoided, unlike a heat treatment that takes place entirely or partly in an oxidizing medium, for example in ambient air.

A person skilled in the art is capable of distinguishing the austenitic, pearlitic, bainitic, ferritic and martensitic microstructures described above, in particular by microscopic observation by known means, for example a scanning electron microscope (SEM) or electron backscatter diffraction (EBSD). This observation could, in a known manner, be preceded by a chemical etching.

The features relating to the operation of the facility 14, such as the intensity of the current in the devices 14 and 16, the temperature of the intermediate cold source 48 and external cold source 54, the flow rate of the external cold source 54, are in particular a function of the size of the element F, of its diameter in the case of a wire, and of the run speed of the element F. The values of these features are within the capabilities of a person skilled in the art who will be able to determine them by successive tests or else by calculation.

Figure 8:
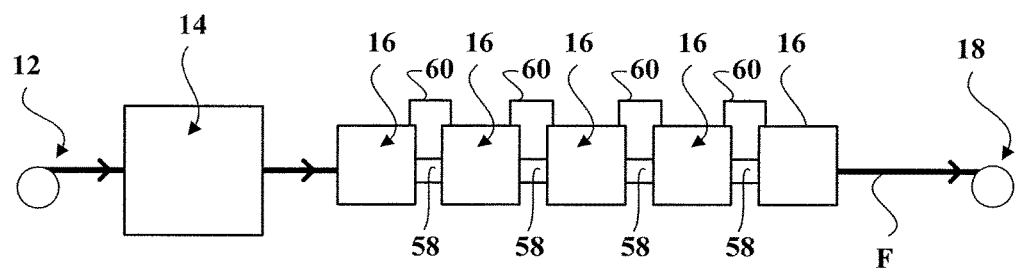
FIG. 8 is a diagram of a heat treatment facility according to a second embodiment.

Represented in FIG. 8 is a second embodiment of a facility for the heat treatment of a reinforcing element for a tire. Elements similar to those represented in the first embodiment are denoted by identical references.

Unlike the first embodiment, the facility according to the second embodiment comprises several cooling devices 16 arranged in series downstream of the heating device 14.

The cooling devices 16 are connected together by ducts 58 for circulation of the element F. These ducts also enable the circulation of the intermediate cold source 48. The cooling devices 16 are also connected together by ducts 60 for circulation of the external cold source 54.

The invention is not limited to the embodiments described above.

In particular it could be envisaged to heat-treat several reinforcing elements simultaneously in one and the same cooling device. Thus, several reinforcing elements may run through the heat extraction means which makes it possible to further increase the total mass throughput without increasing the size of the heat treatment facility.

It could also be envisaged to superimpose several heat treatment facilities on top of one another in order to reduce the floor space requirement.

The reinforcing element could be different from a wire, in particular different from a wire of circular cross section.

The heat treatment method according to the invention could be carried out within the context of a manufacturing method different from that described above. In particular, a manufacturing method comprising two dry-drawing steps or two wet-drawing steps could be used.

It may also be possible to combine the features of the various embodiments described or envisaged above, as long as these are compatible with one another.

The great ease of operation of the method and also the reduced size of the facility described above will be noted, unlike the method and facility from U.S. Pat. No. 4,767,472 in which the relatively low value of the run speed of the facility is compensated for by the simultaneous treatment of several tens of wires that makes it possible to obtain a high total mass throughput despite a mass throughput per wire, i.e. a unit mass throughput, that is low. Furthermore, in U.S. Pat. No. 4,767,472, when the upstream storage reels are empty, it is necessary to join the end of each wire to another wire originating from a full reel. It is therefore necessary to carry out as many joining operations as there are wires, which makes the operation of the heat treatment facility from U.S. Pat. No. 4,767,472 relatively complex and tedious. In addition, it is necessary to have as many reels as there are wires, which makes the heat treatment facility from U.S. Pat. No. 4,767,472 relatively large.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A method for the heat treatment of a steel reinforcing element for a tire, comprising a step of reducing the temperature of the reinforcing element by continuous cooling:
   from an initial temperature of an initial austenite stability range of the steel,
   to a final temperature of a final ferrite-pearlite stability range of the steel,
   passing through at least one transformation range of the steel, the transformation range(s) being distinct from a bainite range,
      wherein the temperature reduction step comprises a transformation from the austenitic microstructure to the ferritic-pearlitic microstructure, with the temperature of the reinforcing element being decreasing during the reduction step, the mean rate of temperature reduction during the transformation of the steel microstructure being greater than or equal to 30° $C.s^{-1}$ and less than or equal to 110° $C.s^{-1}$, and
      wherein heat is supplied to the reinforcing element during at least one part of the step of reducing the temperature of the reinforcing element.

2. The method according to claim 1, wherein the mean rate of temperature reduction during the transformation of the steel microstructure is greater than or equal to 40° $C.s^{-1}$.

3. The method according to claim 1, wherein the mean rate of temperature reduction during the transformation of the steel microstructure is greater than or equal to 50° $C.s^{-1}$.

4. The method according to claim 1, wherein the mean rate of temperature reduction during the transformation of the steel microstructure is greater than or equal to 60° $C.s^{-1}$.

5. The method according to claim 1, wherein the mean rate of temperature reduction during the transformation of the steel microstructure is greater than or equal to 70° $C.s^{-1}$.

6. The method according to claim 1, wherein the mean rate of temperature reduction during the transformation of the steel microstructure is less than or equal to 100° $C.s^{-1}$.

7. The method according to claim 1, wherein the mean rate of temperature reduction during the transformation of the steel microstructure is less than or equal to 90° $C.s^{-1}$.

8. The method according to claim 1, wherein the initial temperature is greater than or equal to 750° C.

9. The method according to claim 1, wherein the final temperature is less than or equal to 650° C.

10. The method according to claim 1, wherein the transformation of the steel microstructure takes place at a temperature within a range extending from 800° C. to 400° C.

11. The method according to claim 1, wherein the temperature is reduced by more than 30° C. during the transformation of the steel microstructure.

12. The method according to claim 1, wherein the temperature reduction step comprises a reduction in the temperature of the reinforcing element in the initial stability range of the steel.

13. The method according to claim 1, wherein the temperature reduction step comprises a reduction in the temperature of the reinforcing element in the final stability range of the steel.

14. The method according to claim 1, wherein the transformation range comprises the ferrite transformation range.

15. The method according to claim 1, wherein the transformation range comprises the pearlite transformation range.

16. The method according to claim 1, wherein, prior to the step of reducing the temperature of the reinforcing element, the method comprises a step of increasing the temperature of the reinforcing element to a temperature greater than or equal to the austenitizing temperature of the steel.

17. The method according to claim 1, wherein the mean run speed of the reinforcing element is greater than 40 $m.min^{-1}$.

18. The method according to claim 1, wherein the mean run speed of the reinforcing element is greater than 90 $m.min^{-1}$.

19. The method according to claim 1, wherein the mean run speed of the reinforcing element is greater than or equal to 200 $m.min^{-1}$.

20. The method according to claim 1, wherein the mean run speed of the reinforcing element is greater than or equal to 300 $m.min^{-1}$.

21. The method according to claim 1, wherein the steel reinforcing element is a steel wire having a diameter in a range from 1 to 2.5 mm.

* * * * *